(12) United States Patent
Guillemin

(10) Patent No.: US 6,751,589 B1
(45) Date of Patent: Jun. 15, 2004

(54) VOICE-ACTUATED GENERATION OF DOCUMENTS CONTAINING PHOTOGRAPHIC IDENTIFICATION

(75) Inventor: Gustavo M. Guillemin, Jalisco (MX)

(73) Assignee: Hewlett-Packard Development Company, L.P., Houston, TX (US)

( * ) Notice: Subject to any disclaimer, the term of this patent is extended or adjusted under 35 U.S.C. 154(b) by 334 days.

(21) Appl. No.: 09/666,493

(22) Filed: Sep. 18, 2000

(51) Int. Cl.[7] .................. G10L 15/28; G10L 15/26; G10L 21/06; G06F 17/00; B42D 15/10

(52) U.S. Cl. .................. 704/235; 704/251; 704/275; 283/77; 707/104.7

(58) Field of Search .................. 704/235, 275, 704/9, 260, 270.1, 272; 396/2; 340/952.2; 705/16

(56) References Cited

U.S. PATENT DOCUMENTS

| | | | | |
|---|---|---|---|---|
| 4,521,014 A | * | 6/1985 | Sitrick | 463/31 |
| 4,961,177 A | * | 10/1990 | Uehara | 704/272 |
| 5,051,924 A | * | 9/1991 | Bergeron et al. | 704/235 |
| 5,838,313 A | | 11/1998 | Hou et al. | 345/302 |
| 5,857,099 A | * | 1/1999 | Mitchell et al. | 704/235 |
| 5,930,528 A | * | 7/1999 | Ito et al. | 396/2 |
| 5,956,681 A | * | 9/1999 | Yamakita | 704/235 |
| 5,960,399 A | * | 9/1999 | Barclay et al. | 704/270.1 |
| 5,963,940 A | * | 10/1999 | Liddy et al. | 704/9 |
| 5,995,936 A | * | 11/1999 | Brais et al. | 704/275 |
| 6,026,388 A | * | 2/2000 | Liddy et al. | 704/9 |
| 6,144,940 A | * | 11/2000 | Nishi et al. | 704/275 |
| 6,243,029 B1 | * | 6/2001 | Tomer | 340/932.2 |
| 6,243,172 B1 | * | 6/2001 | Gauthier et al. | 358/1.18 |
| 6,298,197 B1 | * | 10/2001 | Wain et al. | 396/2 |
| 6,338,035 B1 | * | 1/2002 | Mori | |
| 6,397,194 B1 | * | 5/2002 | Houvener et al. | 705/16 |
| 6,425,825 B1 | * | 7/2002 | Sitrick | 463/31 |
| 6,429,892 B1 | * | 8/2002 | Parker | 348/77 |

FOREIGN PATENT DOCUMENTS

| | | | | |
|---|---|---|---|---|
| JP | 05-159121 | * | 6/1993 | G07B/11/03 |
| JP | 11-194793 | * | 7/1999 | G10L/3/00 |
| JP | 2000-305748 | * | 11/2000 | G06F/3/16 |
| JP | 2000-357068 | * | 12/2000 | G06F/3/12 |
| JP | 2001-287418 | * | 10/2002 | B41J/21/00 |

OTHER PUBLICATIONS

MSOutlook™ ("Microsoft® Office™", Product Enhancements Guide, Oct. 1998).*

MSWord™ ("Microsoft® Office™ Word™", Product Enhancements Guide, Oct. 1998).*

Lucas ("VoiceXML for Web-based Distributed Conversational Applications", Communications of the ACM, Sep. 2000).*

Krell et al ("V-Lynx: Bringing the World Wide Web to Sight Impaired Users", Proceedings of the 2ND annual ACM conference o Assistive technologies, Apr. 1996).*

Huang et al ("Aurora: A Conceptual Model For Web-Content Adaptation To Support The Universal Usability Of Web-Based Services", Proceedings on the Conference on Universal Usability, Nov. 2000).*

* cited by examiner

Primary Examiner—Richemond Dorvil
Assistant Examiner—Daniel Nolan

(57) ABSTRACT

A preferred method for generating a document includes the steps of: providing an applicant with a visual representation, via a visual display device, of at least a portion of a document; prompting an applicant to provide first information corresponding to a first portion of the document; receiving the first information, as a first vocal response, from the applicant; converting the first vocal response to corresponding first textual data; providing the applicant with an updated visual representation, via the visual display device, of the first textual data appearing at the first portion of the document; and generating a printed document corresponding to the updated visual representation of the document. Systems and computer readable media also are provided.

27 Claims, 4 Drawing Sheets

VOICE-ACTUATED GENERATION OF DOCUMENTS CONTAINING PHOTOGRAPHIC IDENTIFICATION

BACKGROUND OF THE INVENTION

1. Field of the Invention

The present invention generally relates to document generation and, in particular, to systems and methods for generating documents utilizing voice recognition.

2. Description of the Related Art

As is known, preparing forms, such as forms for procuring a driver's license, passport, shopping store membership, etc., oftentimes is a tedious endeavor. Such an endeavor typically requires an applicant to provide numerous pieces of personal information which, oftentimes, is hand-written onto an application form, with the filled-in form then being provided to an appropriate representative. Assuming that the application has been correctly and completely filled in, the representative may then transform the hand-written information provided on the application into an appropriate data format, such as by keyboard entry, for instance, and then generates an appropriate document, such as a license, membership card, etc. If, however, the document is to include an image, such as an image corresponding to the likeness of the applicant, for example, the representative also typically must take a photograph of the applicant so that the photograph may be provided on the document.

Unfortunately, the aforementioned process is subject to many potential inefficiencies. For instance, the entity providing the application forms and generating the corresponding documents typically must employ one or more representatives to facilitate application processing. Additionally, information provided by an applicant typically must be transformed into another data format so as to be storable and/or retrievable by the processing entity.

Therefore, there is a need for improved systems and methods which address these and other shortcomings of the prior art.

SUMMARY OF THE INVENTION

Briefly described, the present invention relates to document generation and, more specifically, to systems and methods for generating documents utilizing voice recognition. A preferred embodiment of such a system includes a display device configured to provide a visual representation of at least a portion of a document and an audio input device communicating with the display device. The audio input device is configured to receive audio input from an applicant so that, when an audio input in the form of a verbal response is received from the applicant, the audio input device converts the verbal response to textual data. Thereafter, the textual data may be provided to the display device for display to the applicant in conjunction with the document. An image capturing device also may be provided which is configured to receive image input from an applicant. So provided, when an image input corresponding to the applicant is received, the image capturing device is configured to convert the image input to image data and provide the image data to the display device for display to the applicant in conjunction with the document. Additionally, a document generator is provided which is configured so that, when requisite textual data is acquired by the audio input device, requisite image data is acquired by the image capturing device, and, in some embodiments, a requisite payment is received by a payment-receiving mechanism, the document generator prints the document.

In another embodiment, the system includes: means for providing an applicant with a visual representation of at least a portion of a document; means for prompting an applicant to provide first information corresponding to a first portion of the document; means for receiving the first information, as a first vocal response, from the applicant; means for converting the first vocal response to corresponding first textual data; means for providing the applicant with an updated visual representation of the first textual data appearing at the first portion of the document; and means for generating a printed document corresponding to the updated visual representation of the document.

Some embodiments of the present invention may be construed as providing methods for generating a document, with a preferred method comprising the steps of: providing an applicant with a visual representation, via a visual display device, of at least a portion of a document; prompting an applicant to provide first information corresponding to a first portion of the document; receiving the first information, as a first vocal response, from the applicant; converting the first vocal response to corresponding first textual data; providing the applicant with an updated visual representation, via the visual display device, of the first textual data appearing at the first portion of the document; and generating a printed document corresponding to the updated visual representation of the document.

Additionally, some embodiments of the present invention may be construed as providing computer readable media incorporating a computer program for generating a document. In this regard, a preferred such computer readable medium includes: logic configured to facilitate presentation of a visual representation, via a visual display device, of at least a portion of a document; logic configured to facilitate prompting of an applicant to provide first information corresponding to a first portion of the document; logic configured to facilitate receiving of the first information from the applicant; logic configured to facilitate converting of the first vocal response to corresponding first textual data; logic configured to facilitate providing the applicant with an updated visual representation, via the visual display device, of the first textual data appearing at the first portion of the document; and logic configured to facilitate generating a printed document corresponding to the updated visual representation of the document.

Other features and advantages of the present invention will become apparent to one with skill in the art upon examination of the following drawings and detailed description. It is intended that all such features and advantages be included herein within the scope of the present invention, as defined in the appended claims.

BRIEF DESCRIPTION OF THE SEVERAL VIEWS OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION OF A PREFERRED EMBODIMENT

Figure 1:
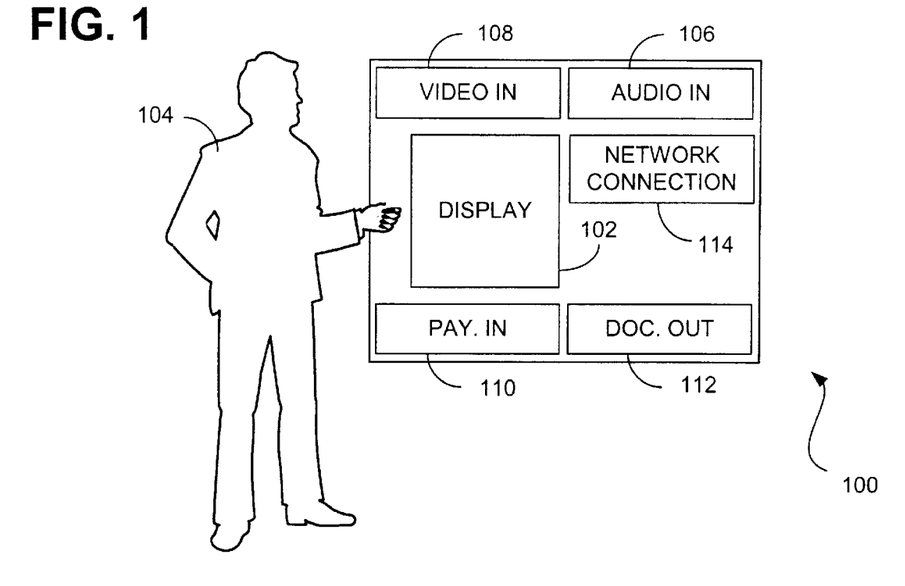
FIG. 1 is a schematic diagram depicting a preferred embodiment of the present invention.

Reference will now be made in detail to the description of the invention as illustrated in the drawings with like numerals indicating like parts throughout the several views. As depicted in FIG. 1, a preferred embodiment of the document processing system 100 of the present invention incorporates a display 102 which may be provided in numerous configurations so as to provide an applicant 104 with convenient access for viewing various document and/or document processing functions (described in detail hereinafter). System 100 also may incorporate a mechanism 106, such as a microphone, for receiving audio input, a mechanism 108, such as a still or video camera, for receiving video input, a mechanism 110, such as a credit/debit card reader and/or money-receiving mechanism, for receiving a payment, and a mechanism or document generator 112, such as a printer and, optionally, a laminator, for providing requested documents. So configured, the document processing system 100 of the present invention is suitable for interfacing with an applicant, so that the applicant is able to provide information to the document processing system and the document processing system may, if appropriate inputs are received, provide the applicant with a corresponding document, e.g., a driver's license, membership card, passport, etc. Additionally, the document processing system may facilitate generation of a database of applicant information, such as by use of a network connection 114 which facilitates data transfer with a data storage/retrieval device (not shown), for example, thereby potentially alleviating the necessity of providing a representative for transforming applicant data to a database format, as mentioned briefly hereinbefore.

Document processing systems of the present invention may be implemented in hardware, software, firmware, or a combination thereof. In a preferred embodiment, however, the document processing system is implemented as a software package, which can be adaptable to run on different platforms and operating systems, in combination with a set of hardware and shall be described further herein. More specifically, a preferred embodiment of the document processing system, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

In the context of this document, a "computer-readable medium" can be any means that can contain, store, communicate, propagate or transport the program for use by or in connection with the instruction execution system, apparatus, or device. The computer readable medium can be, for example, but is not limited to, an electronic, magnetic, optical, electromagnetic, infrared, or semi-conductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable, programmable, read-only memory (EPROM or Flash memory) (magnetic), an optical fiber (optical), and a portable compact disk read-only memory (CDROM) (optical). Note that the computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Figure 2:
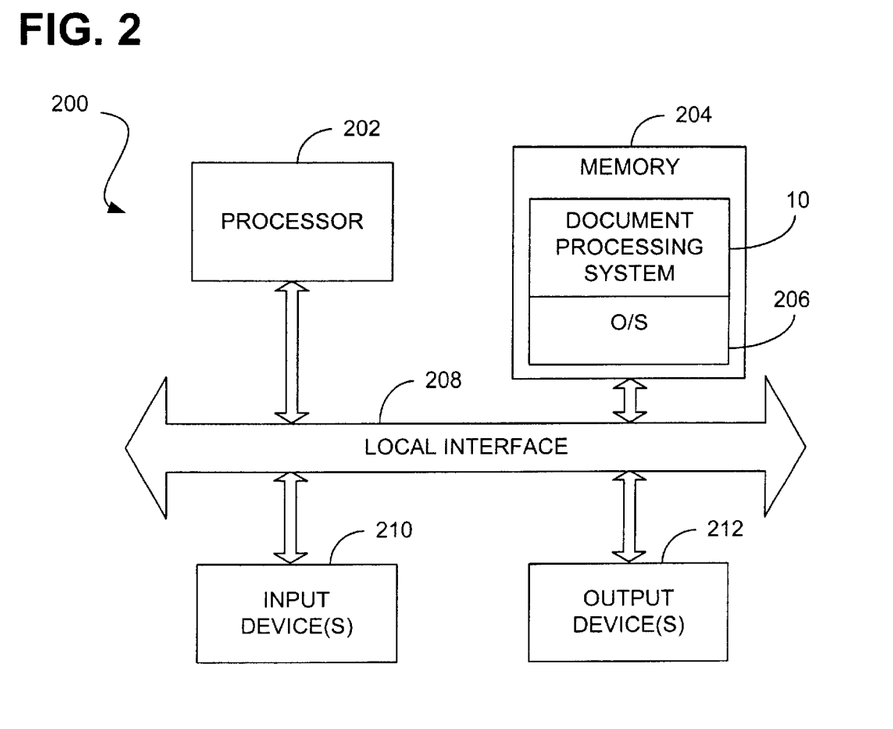
FIG. 2 is a schematic diagram depicting a computer or processor-based device utilized by a preferred embodiment of the present invention.

FIG. 2 illustrates a typical computer or processor-based system 200 which may facilitate document processing system 10 of the present invention. As shown in FIG. 2, a computer system 200 generally comprises a processor 202 and a memory 204 with an operating system 206. Herein, the memory 204 may be any combination of volatile and nonvolatile memory elements, such as random access memory or read only memory. The processor 202 accepts instructions and data from memory 204 over a local interface 208, such as a bus(es). The system also includes an input device(s) 210 and an output device(s) 212. Examples of input devices may include, but are not limited to, a serial port, a scanner, camera, microphone, credit/debit card reader, money slot, or a local access network connection. Examples of output devices may include, but are not limited to, a video display, a Universal Serial Bus, document generator, a printer port or a local access network connection. Generally, this system may run any of a number of different platforms and operating systems, including, but not limited to, HP-ux™, Linux™, Unix™, Sun Solaris™ or Windows NT™ operating systems. The document processing system of the present invention, the functions of which shall be described hereinafter, resides in memory 204 and is executed by the processor 202. It should be noted that one or more processor-based systems, such as the processor-based system depicted in FIG. 2, for example, may be utilized to facilitate the functionality described hereinafter, with the one or more processor-based systems being communicatively coupled, e.g., in a network environment, so that the systems may cooperate to provide the various functions.

Figure 3:
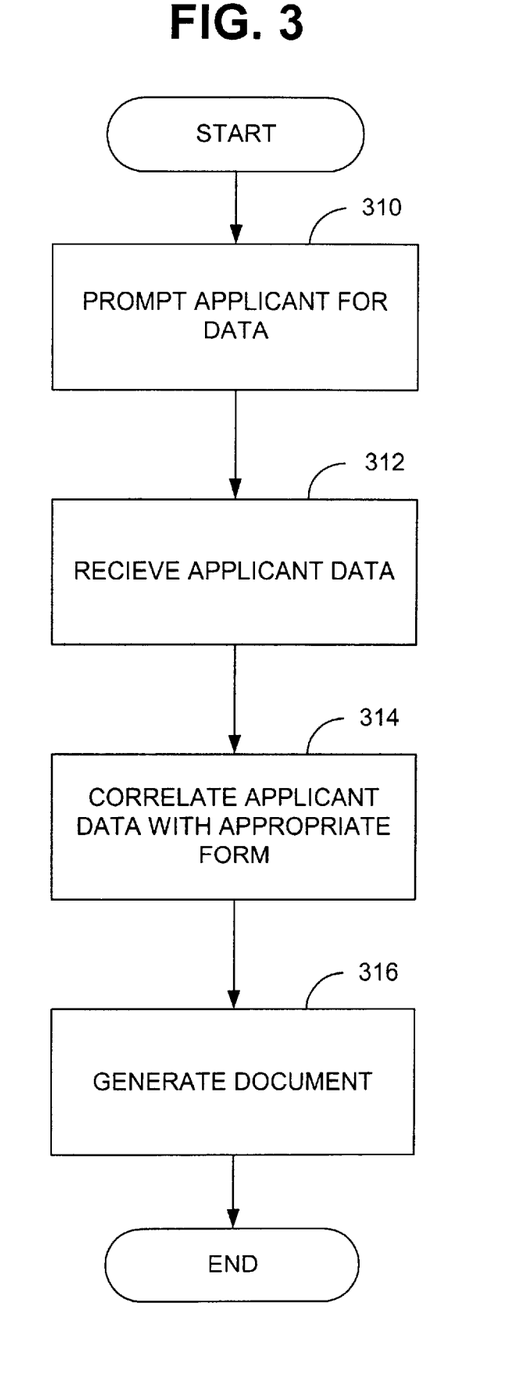
FIG. 3 is a flow chart depicting functionality of a preferred embodiment of the present invention.

The flowchart of FIG. 3 shows the functionality of a preferred implementation of the document processing system. In this regard, each block of the flowchart represents a module segment or portion of code which comprises one or more executable instructions for implementing the specified logical function or functions. It should also be noted that in some alternative implementations the functions noted in the various blocks may occur out of the order depicted in FIG. 3. For example, two blocks shown in succession in FIG. 3 may, in fact, be executed substantially concurrently where the blocks may sometimes be executed in the reverse order depending upon the functionality involved.

As depicted in FIG. 3, the functionality of a preferred embodiment of the document processing system may be construed as beginning at block 310 where the applicant is prompted for data. Such a prompt may be provided in the form of an aural and/or visual indicator that is sufficient to inform the applicant that a particular piece of information is required by the system. Proceeding to block 312, applicant data, e.g., data corresponding to the prompt, preferably is received. Receipt of such applicant data preferably is facilitated by the use of voice recognition functionality which is able to receive and interpret voice commands provided by the applicant for filling in the various information required on the application form.

After receiving appropriate applicant data, the process preferably proceeds to block 314 where the system correlates applicant data with the appropriate portion of the form. Although various methodologies may be employed, preferably, at each instance of filling in a corresponding portion of the applicant form, the applicant may be provided with the opportunity to redo, edit, and/or correct an entry. In some embodiments, the translated voice command, as interpreted by the system, is contemporaneously displayed in conjunction with the form as a textual entry upon the system display. In those circumstances where correction via the voice recognition methodology is inadequate, some embodiments of the document processing system may provide alternative forms of data entry, including, but not limited to, keyboard devices and/or touch screen functionality for receiving manual data inputs from an applicant. Proceeding to block 316, the system generates an appropriate document for the applicant. As mentioned briefly hereinbefore, generation of the appropriate document may require that certain information be provided by the applicant and/or that an appropriate payment be submitted by the applicant, e.g., via payment mechanism 110 (depicted in FIG. 1), so that the document may be generated by the system.

Figure 4:
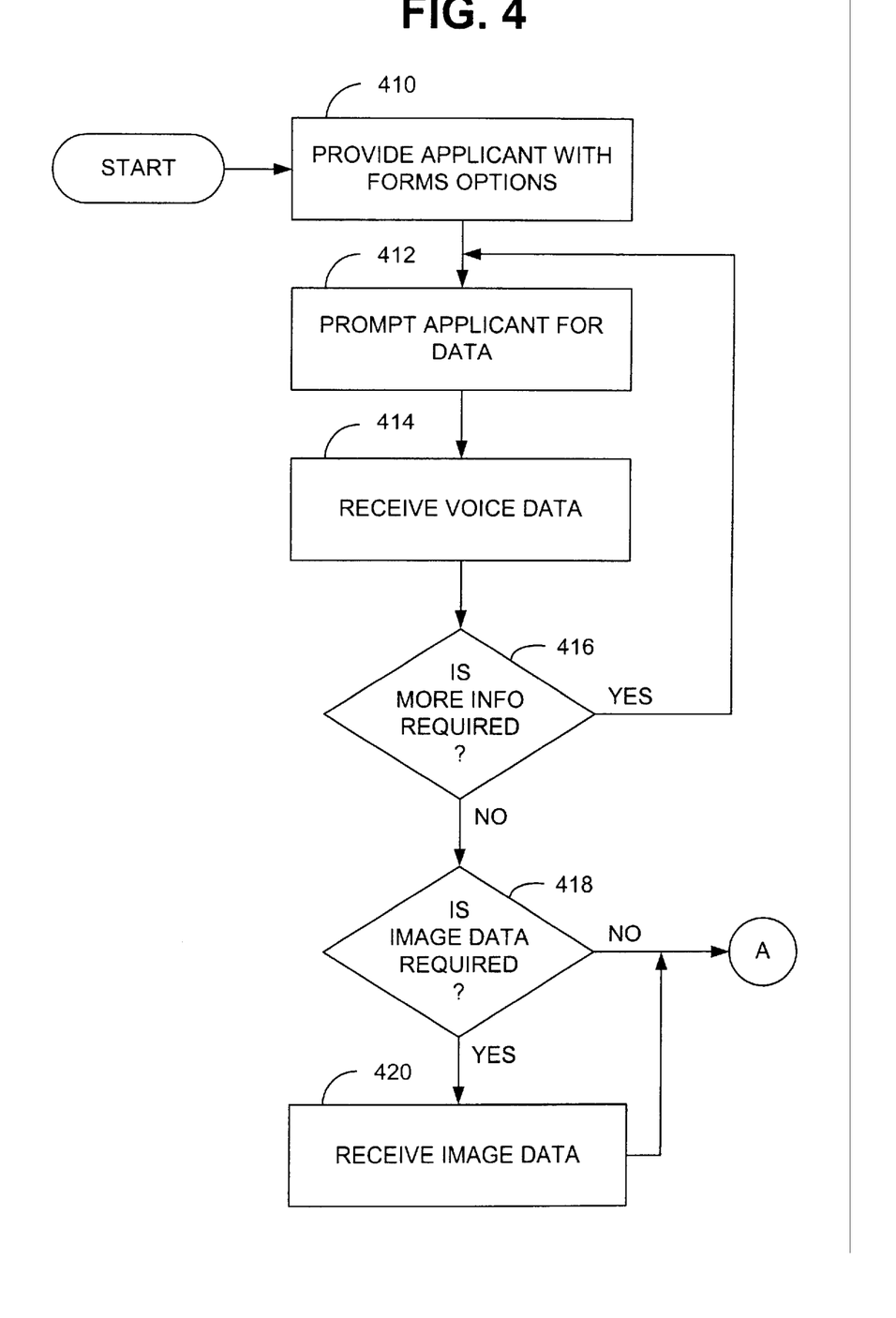
FIG. 4 is a flow chart depicting functionality of a preferred embodiment of the present invention.

Reference is now made to FIG. 4, where a preferred embodiment of the document processing system will be described in greater detail. As depicted in FIG. 4, the process preferably begins at block 410 where the applicant may be provided with various application forms options. An embodiment providing an applicant with such forms options may be associated with a government office, for example, where processing of numerous applications may be facilitated. For instance, a typical motor vehicle administration office may generate various classes of licenses which may require independent and distinct information from an applicant with each class having an appropriately corresponding document or license being generated therefor. In a preferred embodiment, providing the applicant with various forms options may include displaying a prompt associated with a particular form and then receiving an appropriate applicant response, such as via a voice command, touch screen response, keyboard entry, etc., so that an appropriate application form may be selected for processing. After selection of an appropriate form, the process preferably proceeds to block 412 where the applicant is prompted for data so that the form may be appropriately completed. Proceeding to block 414, the system preferably receives voice data corresponding to the respective prompt provided to the applicant with the voice data then being processed by the system, i.e., the voice data is processed and an appropriately corresponding portion of the application is "filled in". At block 416, a determination is made as to whether more information from the applicant is required. If it is determined that more applicant information is required, the process may return to block 412, and proceed as described hereinbefore. However, if it is determined that no additional information is required, an additional determination may be made, such as depicted in block 418. Such a determination may include whether image data is required for application processing. If it is determined that image data is required, the process may proceed to block 420 where image data, e.g., image data corresponding to the applicant, may be acquired by the system, such as through the use of mechanism 108 (depicted in FIG. 108). Image data preferably includes an image of the applicant's person in the form of a photograph. Thereafter, or, alternatively, if it was determined that image data was not required, the process may proceed to connector "A".

Figure 5:
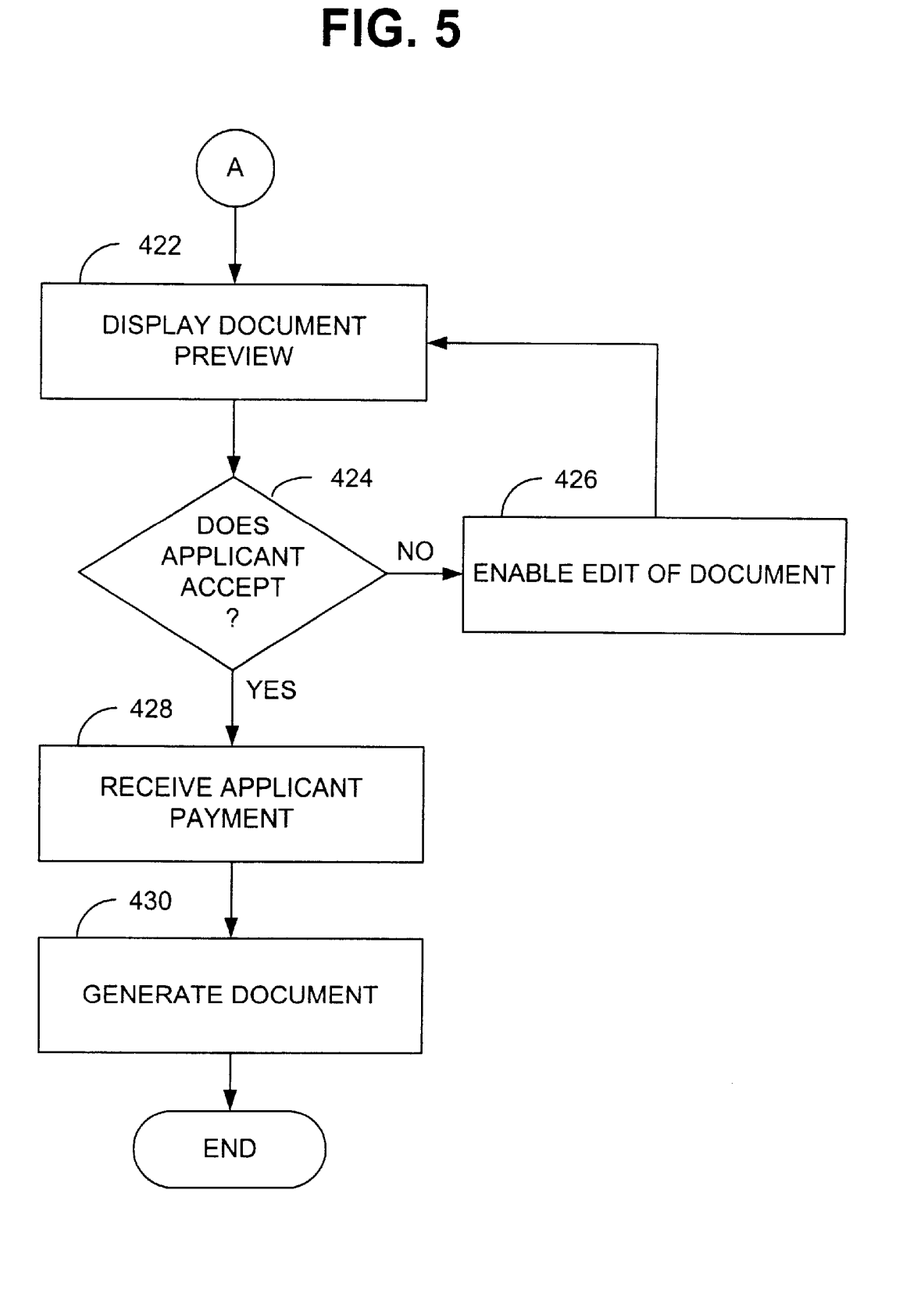
FIG. 5 is a flow chart depicting functionality of a preferred embodiment of the present invention.

Referring now to FIG. 5, and beginning at connector "A", the process may proceed to block 422 where a preview document may be displayed to the applicant. Such a preview document may include a compilation of applicant data and/or image data that is to be generated in the form of the requested document. For instance, if the applicant interfaces with the system for the purpose of renewing a driver's license, the preview document displayed to the applicant may be a representation of the license to be issued. Proceeding to block 424, a determination then is made as to whether an applicant accepts the document displayed for preview—that is, whether the information appearing in the preview document is correct, whether the applicant is satisfied with the image data previously acquired, etc. If it is determined that the applicant does not accept the preview document, the process may proceed to block 426 where editing of the document may be enabled. If so enabled, the system may allow the acquisition of an alternative image, re-entry of various applicant information, etc., and then the process may return to block 422 and proceed as described hereinbefore. If the applicant accepts the preview document, the process may proceed to block 428 where payment provided by the applicant is received. Once proper payment has been received, the document may be generated and provided, as a printed copy, to the applicant (block 430). Additionally, an electronic version of the filled-in form or document may be sent automatically to a predefined network location.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A system, comprising:
 a display device configured to exhibit a form, to a user, the form having a visual prompt contained in the form corresponding to an entry of the form;
 a speaker device configured to aurally request the entry corresponding to the visual prompt in the form while the form is being displayed to the user;
 an input device configured to receive a vocal response corresponding to the entry; and
 logic configured to translate the vocal response into text representative of the vocal response and correlate the text to an entry location in the form, the logic further configured to display the text at the entry location in the form to the user.

2. The system of claim 1, further comprising an image capture device configured to capture an image of the user for insertion into the form.

3. The system of claim 2, wherein the speaker device is further configured to aurally request an image of the user for insertion into a particular location in the form.

4. The system of claim 3, wherein the logic is further configured to receive the image and display the image in an image location in the form.

5. A system, comprising:
 a display device configured to display a form, comprising a plurality of predetermined data fields, each data field related to a particular characteristic of a user, and a predetermined image field at a particular location in the form;

a speaker configured to aurally request a vocal response corresponding to one of the plurality of predetermined fields;

an input device configured to capture the vocal response;

an image capture device configured to receive image data corresponding to the predetermined image field, the image data indicative of the user's person;

logic configured to correlate the vocal response with the corresponding data field and display textual data indicative of the vocal response in the predetermined data field, in response to the vocal response, the logic further configured to display an image corresponding to the captured image data at the particular location in the form corresponding to the predetermined image field.

6. The system of claim 5, further comprising an output device configured to output a document representative of the form, the document comprising a printed representation of the textual data and the image data.

7. A method, comprising the steps of:

displaying a form comprising a visual prompt contained in the form, to a user, the visual prompt corresponding to a requested entry;

aurally requesting a vocal response corresponding to the visual prompt entry while the form is being displayed to the user;

receiving the vocal response;

translating the vocal response into text representative of the vocal response;

correlating the text to an entry location in the form corresponding to the entry; and displaying the text, to the user, at the entry location in the form.

8. The method of claim 7, further comprising the steps of;

displaying a second portion of the form, the second portion of the form comprising an image field;

receiving image data indicative of a user's person; and displaying an image in the image field representative of the image data.

9. The method of claim 8, further comprising the step of producing a document comprising a visual representation of the text at the entry location in the form.

10. The method of claim 9, wherein the document further comprises a visual representation of the image.

11. A method, comprising the steps of:

displaying a form comprising a plurality of predetermined data fields, each data field related to a particular characteristic of a user;

displaying a predetermined image field at a particular location on the form and in relation to the plurality of data fields;

aurally requesting a vocal response corresponding to one of the plurality of predetermined fields;

capturing the vocal response;

correlating the vocal response with a corresponding data field;

receiving image data corresponding to the predetermined image field, the image data indicative of the user's person;

displaying textual data indicative of the vocal response in the predetermined data field corresponding to the aural request; and displaying an image corresponding to the captured image data in the predetermined image field at the particular location in the form.

12. A method, comprising:

displaying a form having a predetermined image field at a particular location on the form;

prompting a user to provide image data to enter in the form;

entering the image data into the form; and printing the form having the image at the particular location on the form corresponding to the predetermined image field.

13. The method of claim 12, further comprising the step of entering spoken information into a predetermined set of data fields of the form.

14. The method of claim 12, wherein entering spoken information into the predetermined set of data fields of the form further comprises translating the spoken information into text and inserting the text into the form at the predetermined data fields.

15. The method of claim 14, further comprising displaying the form with the inserted text and the entered image data and repeating the steps of displaying the form having the predetermined set of data fields, prompting the user to speak information to enter, and entering the text until the form is completed and printing the form.

16. The method of claim 14, further comprising the steps of:

displaying the form having the predetermined set of data fields;

prompting the user to speak information to enter into the predetermined set of data fields; and entering the text into the form.

17. A computer readable medium having instructions thereon for:

displaying a form having a predetermined image field at a particular location on the form and a predetermined set of data fields;

prompting a user to speak information to enter in the form;

prompting the user to enter image data at the particular location;

entering spoken information into the form;

entering the image data at the particular location; and printing the form.

18. The medium of claim 17, wherein the instructions for entering spoken information comprises instructions for translating spoken information into text and inserting the text into the form.

19. The medium of claim 18, further comprising instructions for displaying the form with the inserted text and instructions for repeating the steps of displaying, prompting a user to speak information, and entering the spoken information into the form until the form is completed and printing the form.

20. A system, comprising:

a display device configured to exhibit a form having a visual prompt contained in the form corresponding to an entry of the form;

a speaker device configured to aurally request the entry;

an input device configured to receive a vocal response corresponding to the entry; and logic configured to translate the vocal response into text representative of the vocal response and correlate the text to an entry location in the form, the logic further configured to display the text at the entry location in the form;

an image capture device configured to capture an image of a user for insertion into the form; and wherein the speaker device is further configured to aurally request an image of the user for insertion into a particular location in the form.

21. The system of claim 20, wherein the logic is farther configured to receive the image and display the image in an image location in the form.

22. A method, comprising the steps of:

displaying a form comprising a visual prompt contained in the form corresponding to a requested entry;

aurally requesting a vocal response corresponding to the entry;

receiving the vocal response;

translating the vocal response into text representative of the vocal response;

correlating the text to an entry location in the form corresponding to the entry;

displaying the text at the entry location in the form;

displaying a second portion of the form, the second portion of the form comprising an image field;

receiving image data indicative of a user's person;

displaying an image in the image field representative of the image data; and producing a document comprising a visual representation of the text at the entry location in the form.

23. The method of claim 22, wherein the document further comprises a visual representation of the image.

24. A system, comprising:

a display device configured to exhibit a form to a user, the form having a visual prompt at a particular location corresponding to a predetermined image field;

a speaker device configured to aurally request an image of the user for insertion into the particular location in the form;

an image capture device configured to receive image data indicative of the user's person; and logic configured to display the image data at the particular location in the form.

25. The system of claim 24, further comprising an output device configured to output a document representative of the form, the document comprising a printed representation of the image data.

26. A method, comprising the steps of:

displaying a form to a user, the form having a visual prompt at a particular location corresponding to a predetermined image field;

aurally requesting an image of the user for insertion into the particular location in the form;

capturing image data indicative of the user's person; and displaying the image data at the particular location in the form.

27. The method of claim 26, further comprising the step of printing a document representative of the form, the document comprising a printed representation of the image data.

\* \* \* \* \*

UNITED STATES PATENT AND TRADEMARK OFFICE
CERTIFICATE OF CORRECTION

PATENT NO. : 6,751,589 B1  Page 1 of 1
DATED : June 15, 2004
INVENTOR(S) : Gustavo M. Guillemin

It is certified that error appears in the above-identified patent and that said Letters Patent is hereby corrected as shown below:

Column 7,
Line 28, after "prompt" delete "entry"
Line 38, delete "of;" and insert therefor -- of: --

Column 9,
Line 9, delete "farther" and insert therefor -- further --

Signed and Sealed this

Nineteenth Day of April, 2005

JON W. DUDAS
*Director of the United States Patent and Trademark Office*